United States Patent
McFarland et al.

(10) Patent No.: US 10,975,968 B2
(45) Date of Patent: Apr. 13, 2021

(54) DRIVE SHAFT AXLE SEAL FOR PERFORMANCE TESTING OF TRANSMISSIONS

(71) Applicant: Toyota Motor Engineering & Manufacturing North America, Inc., Plano, TX (US)

(72) Inventors: Jason W. McFarland, Buffalo, WV (US); Andrea L. Hudson, Fraziers Bottom, WV (US); Mike Taylor, Ashton, WV (US)

(73) Assignee: Toyota Motor Engineering & Manufacturing North America Inc., Plano, TX (US)

( * ) Notice: Subject to any disclaimer, the term of this patent is extended or adjusted under 35 U.S.C. 154(b) by 118 days.

(21) Appl. No.: 16/198,070

(22) Filed: Nov. 21, 2018

(65) Prior Publication Data
US 2020/0158243 A1    May 21, 2020

(51) Int. Cl.
*F16J 15/46*    (2006.01)
(52) U.S. Cl.
CPC .................................... *F16J 15/46* (2013.01)
(58) Field of Classification Search
CPC .... F16J 15/46; F16J 15/50; F16J 15/54; F16J 15/36; F16J 15/52; F16J 3/00; F16J 3/04; F16J 3/041; F16J 3/047
USPC ........................................................ 277/529
See application file for complete search history.

(56) References Cited

U.S. PATENT DOCUMENTS

| | | | | |
|---|---|---|---|---|
| 3,130,580 A * | 4/1964 | Lelis | ..................... | F16H 57/025 73/116.04 |
| 4,356,724 A | 11/1982 | Ayoub et al. | | |
| 4,732,036 A | 3/1988 | Weeder | | |
| 5,050,894 A * | 9/1991 | Merel | ..................... | F16J 3/047 251/335.3 |
| 5,397,157 A * | 3/1995 | Hempel | ........... | F02M 35/10137 277/616 |
| 5,576,496 A * | 11/1996 | Carlini | ................. | G01M 13/025 73/121 |
| 5,634,853 A * | 6/1997 | Smith | ....................... | F16C 3/03 464/162 |
| 7,980,123 B2 * | 7/2011 | Ussery | ..................... | F16D 3/68 73/115.01 |
| 9,074,964 B2 * | 7/2015 | Nakagawa | .......... | G01M 13/022 |

FOREIGN PATENT DOCUMENTS

SU    1659766 A1    6/1991

* cited by examiner

*Primary Examiner* — Nathan Cumar
(74) *Attorney, Agent, or Firm* — Oblon, McClelland, Maier & Neustadt, L.L.P.

(57) ABSTRACT

The present disclosure relates to a fluid seal to prevent fluid and lubricant loss during automotive transmission testing. The fluid seal may be disposed on a surface of an axle shaft such that a variety of transmissions may be evaluated without replacement of the axle shaft, a laborious and ergonomically stressful task. Moreover, the fluid seal may be disposed on a standard collar of the axle shaft for interaction with an internal surface of a transmission coupler.

17 Claims, 7 Drawing Sheets

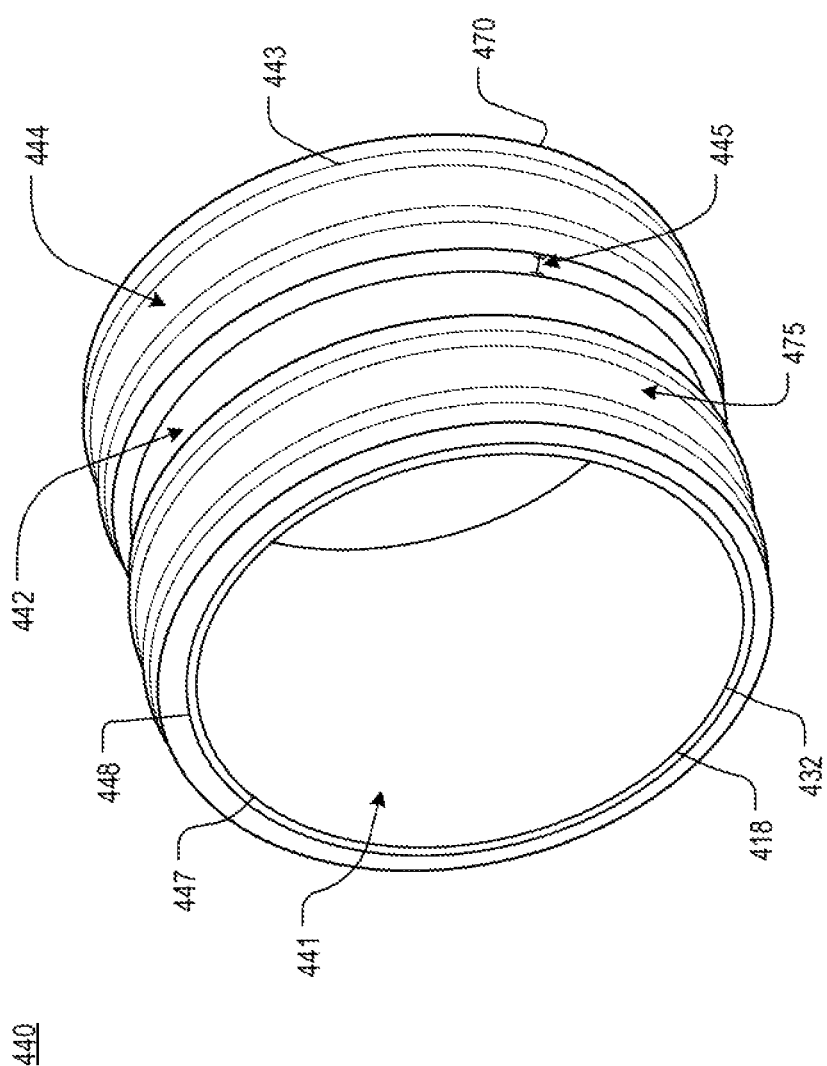

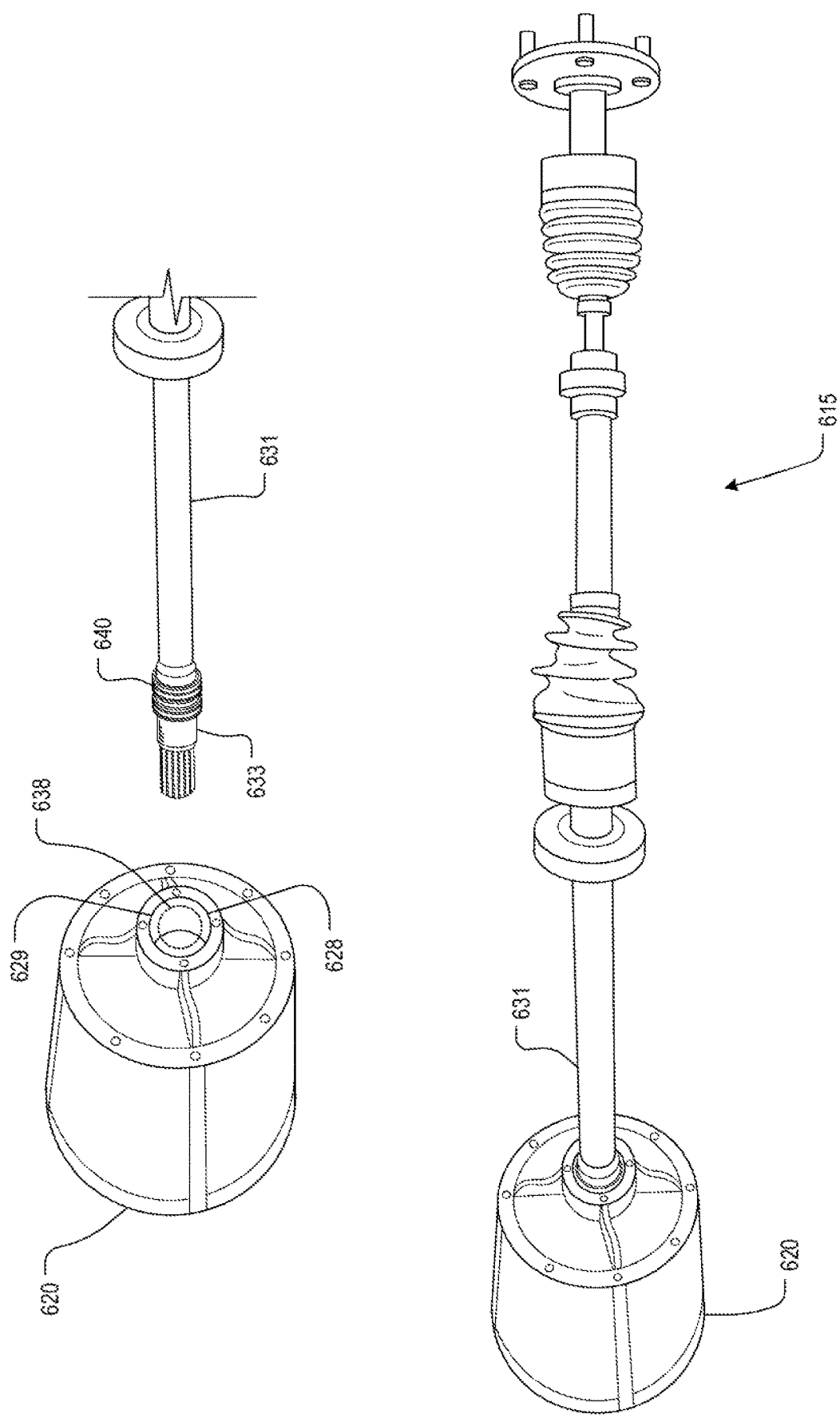

DRIVE SHAFT AXLE SEAL FOR PERFORMANCE TESTING OF TRANSMISSIONS

BACKGROUND

At large automotive manufacturing centers, transmission performance testing is a high volume operation impacting a variety of product lines. These product lines include two-wheel drive and four-wheel drive, automatic and manual, transmission assemblies. In order to expediently evaluate the breadth of the product line, it often becomes necessary to evaluate multiple transmissions on a single performance testing device. This can mean replacing a four-wheel drive transmission for a two-wheel drive transmission, with the corresponding axle drive shafts also requiring replacement, a process that can become cumbersome and place untoward ergonomic strain on the user. U.S. Pat. No. 4,356,724 entitled "Apparatus and method for testing transmissions" by Ayoub, et al., is directed to a transmission tester including input adjustment elements and output adjustment elements permitting various makes and models of transmission to be installed in the tester for evaluation, wherein a splined spacer shaft allows coupling between a disparately positioned output shaft and load shaft. An approach that utilizes an existing spatial coupling while minimizing ergonomic strain during component replacement, however, has yet to be developed.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present invention.

SUMMARY

According to an embodiment, the present disclosure is related to a method of automotive transmission testing, comprising selecting an initial transmission, installing the selected initial transmission and a corresponding initial axle shaft, selecting a subsequent transmission, determining, based upon a comparison of a diameter of the selected initial transmission and a corresponding diameter of the selected subsequent transmission, a requisite axle shaft, uninstalling the selected initial transmission, fitting, concentrically, a fluid seal to the initial axle shaft based upon the determination of the requisite axle shaft, and installing the selected subsequent transmission, wherein the fluid seal has a working diameter, the working diameter being pre-determined relative to the diameter of the selected subsequent transmission.

Further, according to an embodiment, the present disclosure is related to a fluid seal for automotive transmission testing, comprising an outer diameter and one or more compressible elements disposed on a surface of the fluid seal, the one or more compressible elements having a thickness, wherein the surface of the fluid seal is defined by the outer diameter and a length of the fluid seal, wherein the outer diameter and the thickness of the one or more compressible elements defines a working diameter, the working diameter being pre-determined relative to a diameter of a transmission.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 4 is an illustration of a perspective view of a fluid seal, according to an embodiment of the present disclosure;

FIG. 6 is an illustration of a fluid seal in a transmission testing device, according to an embodiment of the present disclosure.

DETAILED DESCRIPTION

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

During automotive transmission performance testing, it is desirable to quickly and safely evaluate a variety of transmissions, including two-wheel drive (2WD) and four-wheel drive (4WD) transmission systems. The design of 2WD and 4WD axle shafts, however, is not consistent, with axle shaft diameters changing in accordance with the design of transmission couplers. Currently, therefore, as a 4WD transmission needs to be replaced with a 2WD transmission, so, too, does a 4WD axle shaft need to be replaced with a 2WD axle shaft. This process can be laborious, as each axle shaft must be decoupled from the transmission at one end and carefully unbolted and removed from a testing unit (e.g. dynamometer) at the other, being careful not to damage the internal electromechanical components of the testing unit. Moreover, each axle shaft can be of a significant weight, making the replacement of axle shafts an ergonomically strenuous task. An ideal approach, eliminating the need for axle shaft replacement during performance testing, has yet to be developed.

With reference to FIG. 1A, FIG. 1B, FIG. 1C and FIG. 1D, an exemplary driven element, or axle shaft assembly 115, is comprised of a proximal end 150 and a distal end 155, the proximal end 150 being coupled to a driving element, or transmission, and the distal end 155 being coupled, or bolted, to a testing unit. An axle shaft 116 connects the proximal end 150 and the distal end 155 of the axle shaft assembly 115. The shaft diameter of the axle shaft 116 at the proximal end 150 of the axle shaft assembly 115 is designed to create a secure fit between the splined end of the axle shaft 116 and the toothed gears of the transmission, as well as to seal the transmission coupling (see FIG. 1B) and prevent the loss and leaking of lubricant.

Figure 1A:
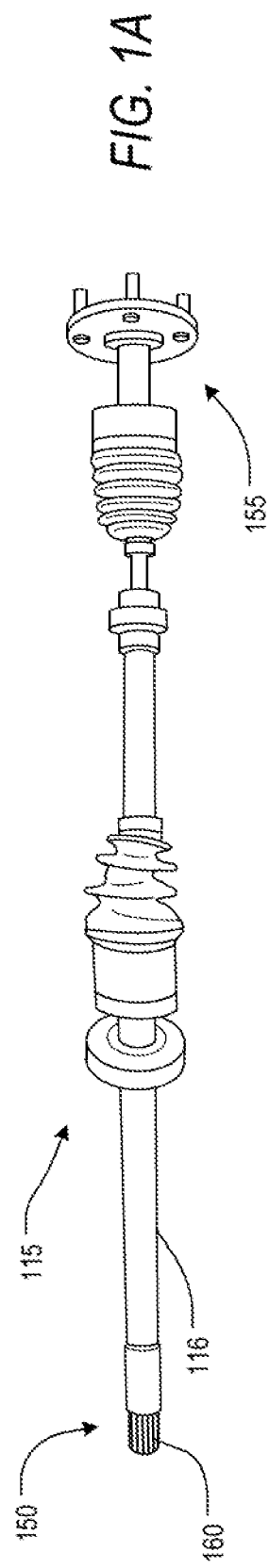
FIG. 1A is a schematic of a transmission testing device, according to an aspect of the present disclosure.
Figure 1B:
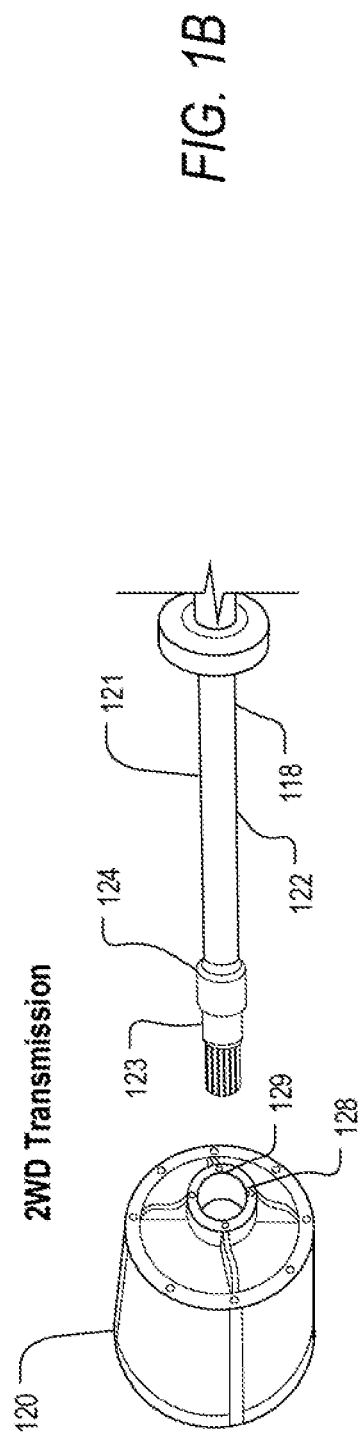
FIG. 1B is a schematic of a transmission testing device, according to an aspect of the present disclosure.

FIG. 1B is an abridged schematic of a transmission testing device. According to an aspect of the present disclosure, the transmission, or driving element, is a 2WD transmission 120. A driven element, or 2WD axle shaft 121, has a known 2WD axle shaft diameter 122 corresponding to a 2WD transmission coupler diameter 128 of the 2WD transmission 120. Positioned at the proximal end of the 2WD axle shaft 121, a dilated collar 124 is disposed circumferentially on a standard collar 123. The standard collar 123 can be a diameter equal to the 2WD axle shaft diameter 122 or may be another diameter irrespective of the 2WD transmission coupler diameter 128. The dilated collar 124 can be a diameter relatively larger than the diameter of the standard coupler 123. Moreover, the dilated collar 124 can be a diameter pre-determined relative to the 2WD transmission coupler diameter 128, in order to provide adequate coupling with a 2WD transmission coupler 129. During evaluation of the 2WD transmission 120, the 2WD axle shaft 122 is inserted into the 2WD transmission coupler 129 such that the splined surface of the proximal end of the 2WD axle shaft 122 may couple to internal, mechanical components of the 2WD transmission 120. The dilated collar 124 provides a seal with the diameter 128 of the 2WD transmission coupler 129, preventing loss or leakage of lubricant from the 2WD transmission 120. In another embodiment, wherein the transmission under testing may include but is not limited to front-wheel drive transmissions, rear-wheel drive transmissions, automatic transmissions, manual transmissions, transverse transmissions, automated manual transmissions, or continuously variable transmissions, a corresponding axle shaft diameter 118 is related to a transmission coupler diameter.

Figure 1C:
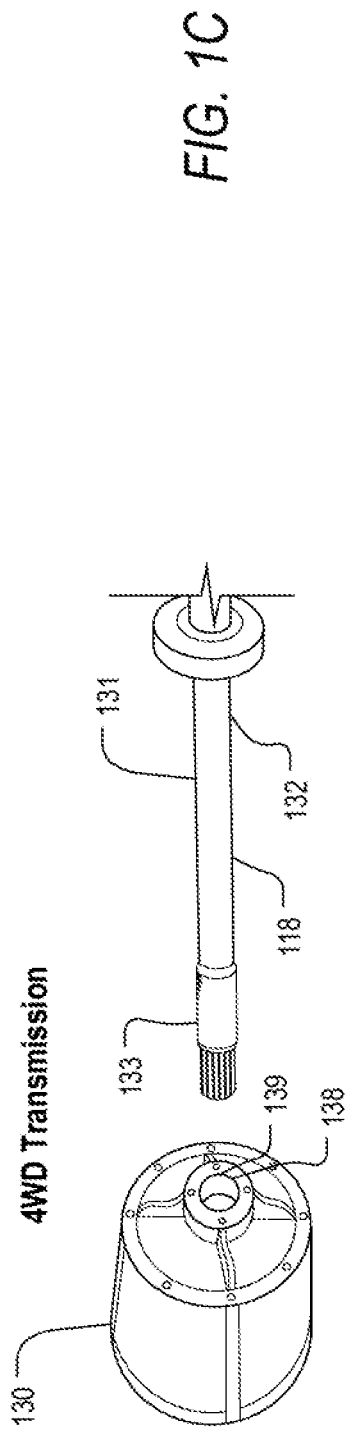
FIG. 1C is a schematic of a transmission testing device, according to an aspect of the present disclosure.

FIG. 1C is an abridged schematic of a transmission testing device. According to an aspect of the present disclosure, the transmission, or driving element, is a 4WD transmission 130. A driven element, or 4WD axle shaft 131, has a known 4WD axle shaft diameter 132 corresponding to a 4WD transmission coupler diameter 138 of the 4WD transmission 130. A standard collar 133 is disposed at the proximal end of the 4WD axle shaft 131. The standard collar 133 can be a diameter equal to the 4WD axle shaft diameter 132 or may be another diameter irrespective of the 4WD transmission coupler diameter 128. Moreover, the standard collar 133 can be a diameter pre-determined relative to the 4WD transmission coupler diameter 138, in order to provide adequate coupling with a 4WD transmission coupler 129. During evaluation of the 4WD transmission 130, the 4WD axle shaft 132 is inserted into the 4WD transmission coupler 139 such that the splined surface of the proximal end of the 4WD axle shaft 132 may couple to internal, mechanical components of the 4WD transmission 130. The standard collar 133 provides a seal with the diameter 138 of the 4WD transmission coupler 139, preventing loss or leakage of lubricant from the 4WD transmission 130. In another embodiment, wherein the transmission under testing may include but is not limited to front-wheel drive transmissions, rear-wheel drive transmissions, automatic transmissions, manual transmissions, transverse transmissions, automated manual transmissions, or continuously variable transmissions, a corresponding axle shaft diameter 118 is related to a transmission coupler diameter.

Figure 1D:
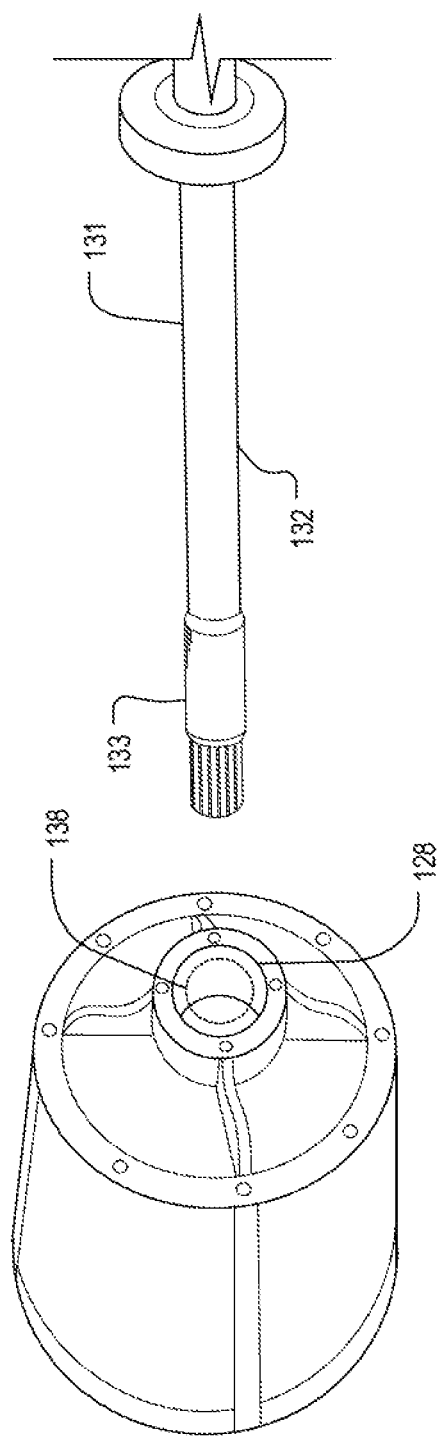
FIG. 1D is a schematic of a transmission testing device, according to an aspect of the present disclosure.

Each axle shaft is designed in context of the diameter of the transmission coupler. As a result, and as illustrated in FIG. 1D, a 4WD axle shaft 131 may not be able to create a fluid-tight seal with a 2WD transmission, as the diameter 132 of the 4WD axle shaft 131, or the diameter 133 of the standard collar, therein, are designed in context of the diameter 138 of a 4WD transmission coupler. In order to create a fluid-tight seal with a 2WD transmission, the axle shaft must be replaced with a 2WD axle shaft, or another solution must be created to modify the diameter of the standard collar 133 of the 4WD axle shaft 131 such that it will occupy the space between the diameter 138 of the 4WD transmission coupler and the diameter 128 of the 2WD transmission coupler, resembling the design of the dilated collar 124 of FIG. 1B.

Figure 2:
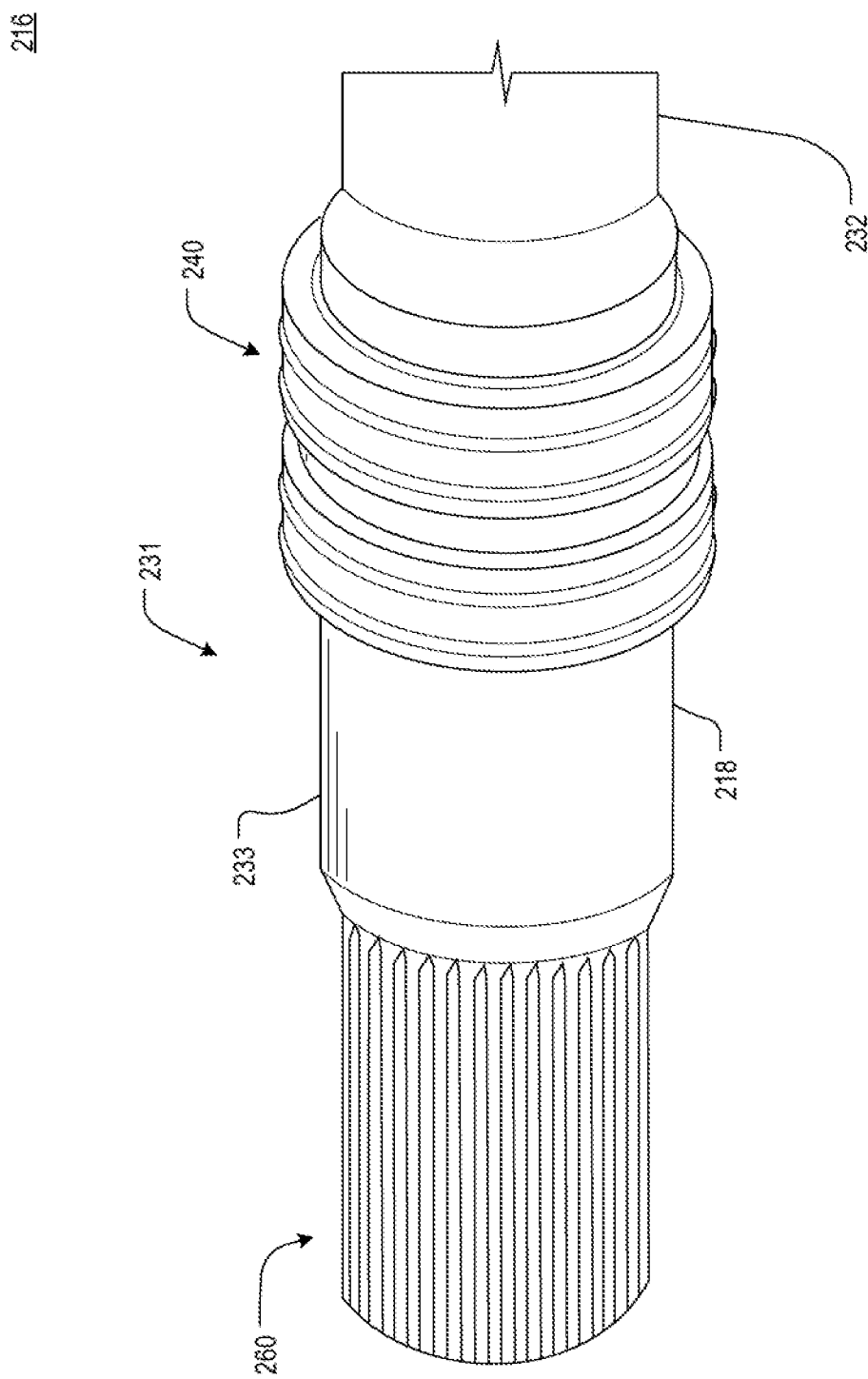
FIG. 2 is an illustration of a distal end of an axle shaft, according to an embodiment of the present disclosure.

With reference to FIG. 2, such a solution, as described in the present disclosure, may include a fluid seal. FIG. 2 is an illustration of a distal end of an axle shaft. According to an embodiment of the present disclosure, the axle shaft 216 is a 4WD axle shaft 231. Further, an axle shaft diameter 218 is a 4WD axle shaft diameter 232. A splined surface 260 is disposed at a proximal end of the 4WD axle shaft 231 for coupling with a toothed gear, or similar mechanical component, of a transmission. Adjacent to the splined surface 260, a standard collar 233 is disposed. As described above, the diameter of the 4WD axle shaft 232, or the standard collar 233, therein, may be found incongruent with the diameter of a 2WD transmission coupler. In response, a fluid seal 240 may be concentrically disposed on a surface of the standard collar 233. In another embodiment, the fluid seal may be concentrically disposed on a surface of the 4WD axle shaft 232 with a 4WD axle shaft diameter 232. The fluid seal 240 can be of a diameter congruent with a transmission coupler of a 2WD transmission or can otherwise be sized in order to create a fluid-tight seal with a transmission coupler of a transmission. The fluid seal 240 can be readily removed or installed on a surface of the 4WD axle shaft during performance testing of multiple transmissions. Possible dimensions, material composition, and granular features of the fluid seal 240 can be determined according to a specific implementation. A more complete understanding of the fluid seal 240, according to an exemplary embodiment of the present disclosure, can be found below with reference to FIG. 4, FIG. 5A, and FIG. 5B.

According to an embodiment of the disclosure, the splined surfaces of the varying axle shafts are substantially similar and configured, similarly, to engage with and be driven by the driving element.

Further, it can be appreciated that a 2WD transmission and a 4WD transmission are exemplary embodiments of the present disclosure and that placement of a fluid seal is independent of a specific axle shaft, but rather dependent on the relative diameters and positions of axle shafts and transmission couplers.

Figure 3A:
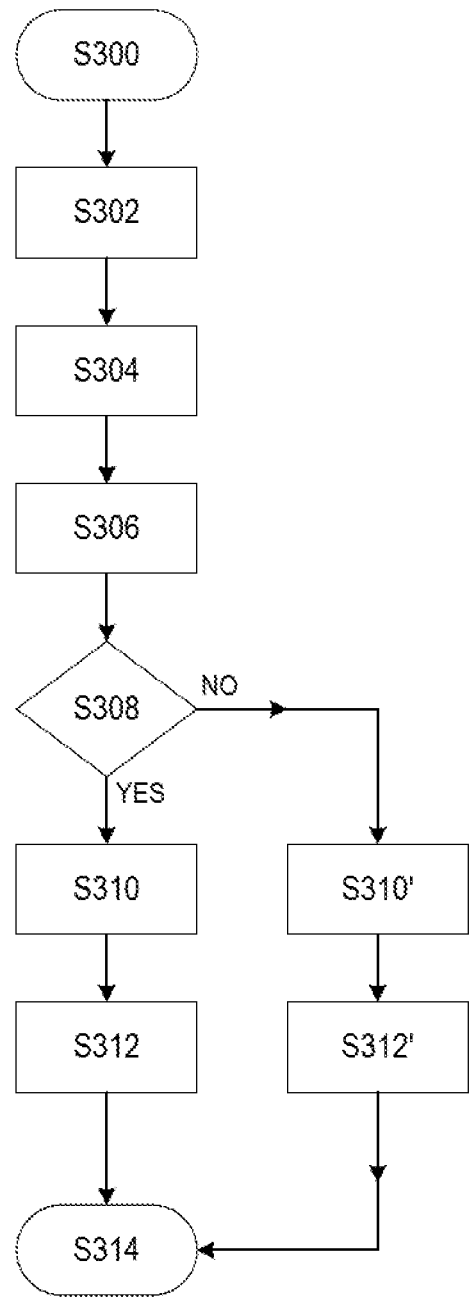
FIG. 3A is a flowchart of a transmission testing protocol, according to an aspect of the present disclosure.
Figure 3B:
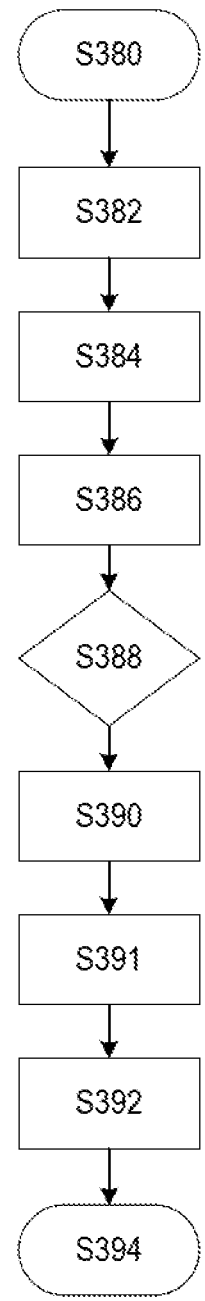
FIG. 3B is a flowchart of a transmission testing protocol, according to an embodiment of the present disclosure.

FIG. 3A and FIG. 3B describe an implementation of a fluid seal, according to current testing methods (FIG. 3A) and according to an exemplary embodiment of the present disclosure (FIG. 3B). Initially, in FIG. 3A and according to current testing methods, an initial transmission is selected for performance testing S300. In an embodiment, the initial transmission is a 4WD transmission. At S302, the requisite 4WD transmission and 4WD axle shaft components are installed. Installation includes bolting the distal end of the 4WD axle shaft to a testing unit (e.g., dynamometer) and coupling the proximal end of the 4WD axle shaft with the 4WD transmission via the 4WD transmission coupler. Once secured, performance testing of the 4WD transmission may commence S304. Following evaluation of the initial transmission, a subsequent transmission may be selected for performance testing S306. It is then determined if the subsequent transmission requires replacement of the axle shaft S308. In an embodiment, the subsequent transmission is a 2WD transmission. As a result, in addition to the transmission, it is required that the 4WD axle shaft be replaced with a 2WD axle shaft S310'. As described above, the axle shaft is replaced in order to match the diameter of the standard collar, or a dilated collar, of the axle shaft with the diameter of the transmission coupler such that a fluid-tight seal is created between the axle shaft and the transmission. To replace the 4WD axle shaft, following decoupling of the 4WD axle shaft from the 4WD transmission, the 4WD axle shaft is unbolted from the testing unit and carefully removed from the testing unit, the full weight of the 4WD axle shaft potentially being borne by the user. Once removed, a 2WD axle shaft is carefully inserted into the testing unit, bolted to the testing unit, and, subsequently, coupled to a coupler of the 2WD transmission S312'. Again, during installation, the full weight of the axle shaft may be borne by the user. Once installed, evaluation of the 2WD transmission is initiated S314. If it is determined that the subsequent transmission is a 4WD transmission S308, only the 4WD transmission needs to be removed S310 and replaced S312 with the subsequent 4WD transmission. Performance testing may then be initiated S314.

When necessary, and as described above, lifting and manipulating an axle shaft can be cumbersome and ergonomically strenuous for the user with current testing methods. According to an embodiment of the present disclosure, a fluid seal, described in FIG. 2, can be implemented to alleviate user discomfort and improve testing efficiency.

Initially, in FIG. 3B and according to an embodiment of the present disclosure, an initial transmission is selected for performance testing S380. In an embodiment, the initial transmission is a 4WD transmission. At S382, the requisite 4WD transmission and 4WD axle shaft components are installed. Installation includes bolting the distal end of the 4WD axle shaft to a testing unit (e.g., dynamometer) and coupling the proximal end of the 4WD axle shaft with the 4WD transmission via the 4WD transmission coupler. Once secured, performance testing of the 4WD transmission may commence S384. Following evaluation of the initial transmission, a subsequent transmission may be selected for performance testing S386. In an embodiment, the subsequent transmission may be a 2WD transmission or a 4WD transmission. If it is determined that the subsequent transmission selected for performance testing is a 2WD transmission S388, arrangements must be made to match the diameter of the distal end of the axle shaft with the diameter of the transmission coupler. As described above, under current testing methods, this would require the replacement of the axle shaft in order to match the diameter of the standard collar, or the dilated collar, of the axle shaft with the diameter of the transmission coupler such that a fluid-tight seal is created between the axle shaft and the transmission. According to an embodiment of the present disclosure, however, and in order to prevent cumbersome manipulation of the distal end of the 4WD axle shaft with respect to the testing unit, a fluid seal may be deployed circumferentially around the proximal end of the 4WD axle shaft in order create congruent surfaces between the axle shaft and the transmission coupler. During replacement of the 4WD transmission and following removal of the transmission S390, the fluid seal is fitted onto the standard collar of the 4WD axle shaft S391, dilating the diameter of the collar relative to the diameter of the transmission coupler. According to an embodiment, the position of the fluid seal is relative to the dimensions of the standard collar of the axle shaft, or the position of the dilated collar of a 2WD axle shaft, and is further dependent on the design and construction of the transmission. With the fluid seal in place, and the subsequent transmission, or 2WD transmission, correctly positioned, the 4WD axle shaft may be installed into the 2WD transmission and coupled to the 2WD transmission coupler S392. Correctly designed, the fluid seal will be geometrically fit within the transmission coupler. Once installed, evaluation of the 2WD transmission is initiated S394. Alternatively, if it is determined that the subsequent transmission is a 4WD transmission, only the 4WD transmission needs to be removed S310 and replaced S312 with the subsequent 4WD transmission. The fluid seal is not required.

FIG. 4 is an illustration of a perspective view of a fluid seal, as described above. According to an exemplary embodiment of the present disclosure, a fluid seal 440 is of a substantially cylindrical shape, comprising an inner diameter 447 and an outer diameter 448. In an embodiment, the inner diameter 447 is of a pre-determined size relative to an axle shaft diameter 418 or the diameter of a standard collar. In another embodiment, the inner diameter 447 of the fluid seal 440 is of a pre-determined size relative to the diameter of a 4WD axle shaft. A pre-determined inner diameter 447 and length create an inner surface 441 of the fluid seal 440. Contact between the inner surface 441 of the fluid seal 440 and an axle shaft creates an interference fit, holding the two surfaces as relatively positioned. The pre-determined outer diameter 448 and length create an outer surface 442 of the fluid seal 440. In an embodiment, the dimensions, and length, in particular, of the fluid seal 440 are determined relative to the transmission coupler and are selected appropriately as informed by external specifications.

According to an embodiment, one or more compressible elements 475 may be disposed on the outer surface. In an embodiment, the one or more compressible elements 475 are an annulus 444. Each of the one or more compressible elements 475 may be comprised of one or more of a variety of materials, including but not limited to polyurethane, natural rubber, acrylonitrile-butadiene, polytetrafluoroethylene, silicone, polymyte, nitrile, ethylene propylene, and fluorocarbon, exhibiting characteristics appropriate for transmission performance testing (e.g., temperature range, fluid compatibility, durability).

According to an embodiment of the present disclosure, the one or more compressible elements 475 have a pre-determined thickness 445 relative to the diameter of a transmission coupler, the outer diameter 448, and the compressibility of the one or more compressible elements 444.

A working diameter 470 of the fluid seal 440 is defined by an addition of the thickness 445 of the one or more compressible elements in an uncompressed state and the outer diameter 448.

According to an embodiment of the present disclosure, the one or more compressible elements 475 can further comprise one or more features 443 for interaction with an internal surface of the transmission, relative to the diameter of a transmission coupler. FIG. 5A is an illustration of a lateral perspective of a fluid seal. One or more compressible elements 575 are disposed on an outer surface 542. The one or more compressible elements 575 may be separated by a pre-determined gap 576. In an embodiment, the one or more compressible elements 575 are an annulus 544. One or more features 543 may be disposed on a surface of each of the one or more compressible elements 575, or each of the one or more annulus 544. According to an embodiment, each of the one or more features 543 is positioned for interaction with an internal surface of the transmission. Each of the one or more features 543 may have a cross-sectional shape selected from a group including but not limited to a hemisphere, a triangle, a square, a rectangle, or a combination thereof. Each of the one or more features 543 may be continuous, discontinuous, or a combination thereof, over the surface of the one or more compressible elements 575. Moreover, each of the one or more features 543 of the one or more compressible elements 575 may be linear, curved, or a combination thereof over the surface of the one or more compressible elements 575. In an embodiment, the dimensions of each of the one or more features 543, including the feature height 546, are determined according to the working diameter of the fluid seal 540 relative to the diameter of the transmission coupler and in order to create a fluid-tight seal.

Figure 5B:
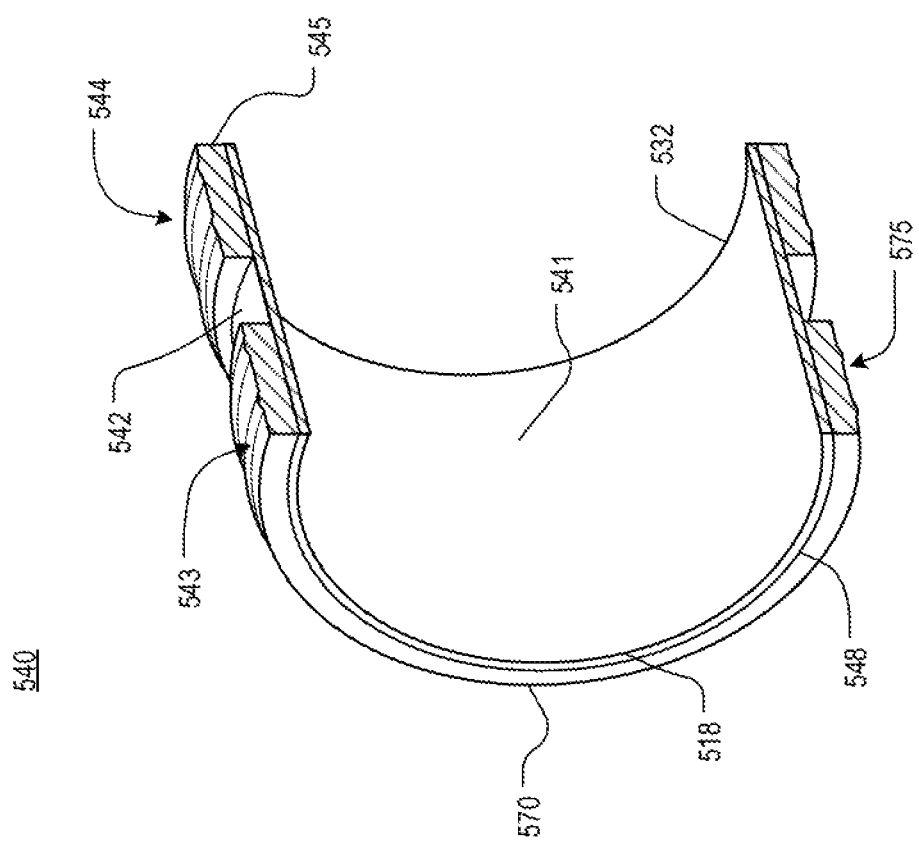
FIG. 5B is a cross-sectional illustration of the perspective view of a fluid seal, according to an embodiment of the present disclosure.
Figure 5A:
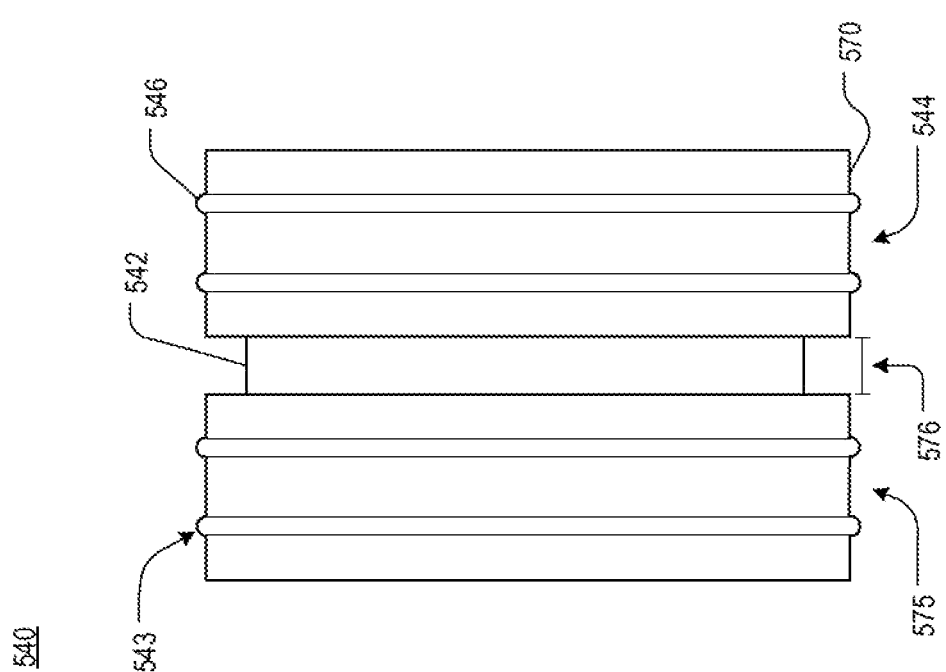
FIG. 5A is an illustration of a lateral view of a fluid seal, according to an embodiment of the present disclosure.

FIG. 5B is an illustration of a cross-section of a perspective view of a fluid seal. According to an embodiment, the fluid seal 540 has an inner diameter 518 and an outer diameter 548. An inner surface 541 is defined by the inner diameter 518 of the fluid seal 540 and the length of the fluid seal 540. A working diameter 570 is defined by the outer diameter 548 and the height 545 of one or more compressible elements 575. In an embodiment, the one or more compressible elements 575 are an annulus 544. The one or more compressible elements 575 may be disposed on an outer surface 542 of the fluid seal 540. One or more features 543 may be disposed on a surface of the one or more compressible elements 575, or on a surface of the one or more annulus 544. The inner diameter 518 of the fluid seal 540 is pre-determined relative to the diameter of an axle shaft. In an embodiment, the axle shaft is a 4WD axle shaft 532. The working diameter 570 is pre-determined relative to the diameter of the transmission coupler and in order to create a fluid-tight seal.

According to an embodiment of the present disclosure, the one or more compressible elements 575 may be identical or dissimilar.

FIG. 6 is an illustration of the fluid seal in a transmission testing device. According to an embodiment of the present disclosure, a 4WD axle shaft 631 is installed in the testing device and bolted to the testing unit (e.g. dynamometer (not shown)). A subsequent transmission has been selected for testing. In an embodiment, the subsequent transmission is a 2WD transmission 620. A diameter 628 of a 2WD transmission coupler 629 is larger than a diameter of a standard collar 633 of the 4WD axle shaft 631. (As a comparison, a 4WD transmission coupler diameter 638 is denoted by a dashed line). Therefore, and in order to prevent laborious and ergonomically stressful lifting and manipulation of the 4WD axle shaft during replacement, a fluid seal 640 is outfitted on a surface of the standard collar 633 to dilate the diameter of the standard collar. The fluid seal 640 may be of a working diameter pre-determined to create a fluid-tight seal with an internal surface of the coupler of the 2WD transmission. Following positioning of the fluid seal 640 on the surface of the standard collar 633, the 4WD axle shaft 631 can be coupled to the 2WD transmission 620. Once coupled with the transmission coupler of the 2WD transmission 620, the 4WD axle shaft 631 and axle shaft assembly 615, or driven element, are in position to transfer energy from the 2WD transmission 620 to the testing unit.

Through implementation of the fluid seal 640, as described in the present disclosure, it is possible to reduce human injury and discomfort by eliminating the need to replace axle shafts during the evaluation of a variety of transmission types. Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method of automotive transmission testing, comprising:
    selecting an initial transmission;
    installing the selected initial transmission and a corresponding initial axle shaft;
    selecting a subsequent transmission;
    determining, based upon a comparison of a diameter of the selected initial transmission and a corresponding diameter of the selected subsequent transmission, a requisite axle shaft;
    uninstalling the selected initial transmission;
    fitting, concentrically, a fluid seal to the initial axle shaft based upon the determination of the requisite axle shaft; and
    installing the selected subsequent transmission,
    wherein the fluid seal includes
        a seal having an axial length and an outer diameter, the axial length and the outer diameter defining an outer surface of the seal, and
        two or more compressible elements, each having a radial thickness, disposed on the outer surface of the seal and at positions along the axial length of the seal, each of the two or more compressible elements including features that project from an outer surface of each compressible element, the outer surface of each compressible element being defined by an outer diameter of each compressible element and an axial length of each compressible element, wherein the outer diameter of the seal, twice the radial thickness of one of the two or more compressible elements, and twice a radial thickness of one of the features define a working diameter that is pre-determined relative to the corresponding diameter of the selected subsequent transmission to be subjected to the automotive transmission testing, the radial thickness of each of the two or more compressible elements being half a distance between the outer diameter of the seal and the outer diameter of each compressible element.

2. The method according to 1, wherein each of the features have a cross-sectional shape selected from a group including but not limited to a hemisphere, a triangle, a square, a rectangle, or a combination thereof.

3. The method according to 1, wherein each of the features is linear, curved, or a combination thereof over the outer surface of each the two or more compressible elements.

4. The method according to 1, wherein each of the features is continuous, discontinuous, or a combination thereof over the outer surface of each of the two or more compressible elements.

5. The method according to 1, wherein the two or more compressible elements are annuli.

6. The method according to 1, wherein the fluid seal further comprises an inner diameter, the inner diameter being pre-determined relative to a diameter of the initial axle shaft.

7. The method according to 1, wherein the two or more compressible elements arranged at positions along the axial length of the seal are separated, along the axial length of the seal, by a pre-determined distance, an exposed outer surface of the seal being defined by the outer diameter of the seal and the pre-determined distance between the two or more compressible elements.

8. The method according to 1, wherein a diameter of the initial axle shaft is smaller than a diameter of the requisite axle shaft.

9. A fluid seal for automotive transmission testing, comprising:
a seal having an axial length and an outer diameter, the axial length and the outer diameter defining an outer surface of the seal; and
two or more compressible elements, each having a radial thickness, disposed on the outer surface of the seal and at positions along the axial length of the seal, each of the two or more compressible elements including features that project from an outer surface of each compressible element, the outer surface of each compressible element being defined by an outer diameter of each compressible element and an axial length of each compressible element,
wherein the outer diameter of the seal, twice the radial thickness of one of the two or more compressible elements, and twice a radial thickness of one of the features define a working diameter that is pre-determined relative to a diameter of an automotive transmission to be subjected to the automotive transmission testing, the radial thickness of each of the two or more compressible elements being half a distance between the outer diameter of the seal and the outer diameter of each compressible element.

10. The fluid seal according to claim 9, wherein each of the features have a cross-sectional shape selected from a group including but not limited to a hemisphere, a triangle, a square, a rectangle, or a combination thereof.

11. The fluid seal according to claim 9 wherein each of the features is linear, curved, or a combination thereof over the outer surface of each of the two or more compressible elements.

12. The seal according to claim 9, wherein each of the features is continuous, discontinuous, or a combination thereof over the outer surface of each of the two or more compressible elements.

13. The fluid seal according to claim 9, wherein the two or more compressible elements are annuli.

14. The fluid seal according to claim 9, wherein an inner diameter of the seal is pre-determined relative to a diameter of an axle shaft associated with the automotive transmission to be subjected to the automotive transmission testing.

15. The fluid seal according to claim 14, wherein the diameter of the axle shaft is a diameter of a standard collar of the axle shaft.

16. The fluid seal according to claim 9, wherein the two or more compressible elements arranged at positions along the axial length of the seal are separated, along the axial length of the seal, by a pre-determined distance, an exposed outer surface of the seal being defined by the outer diameter of the seal and the pre-determined distance between the two or more compressible elements.

17. The seal according to claim 9, wherein the automotive transmission is a two-wheel drive transmission or a four-wheel drive transmission.

* * * * *